US012722321B2

(12) United States Patent
Graziano

(10) Patent No.: US 12,722,321 B2
(45) Date of Patent: Sep. 1, 2026

(54) SAW GUIDE

(71) Applicant: Thomas Graziano, Lindenhurst, NY (US)

(72) Inventor: Thomas Graziano, Lindenhurst, NY (US)

( * ) Notice: Subject to any disclaimer, the term of this patent is extended or adjusted under 35 U.S.C. 154(b) by 611 days.

(21) Appl. No.: 16/918,913

(22) Filed: Jul. 1, 2020

(65) Prior Publication Data

US 2022/0001568 A1 Jan. 6, 2022

(51) Int. Cl.
*B27B 17/00* (2006.01)
*B27G 19/00* (2006.01)

(52) U.S. Cl.
CPC ...... *B27B 17/0083* (2013.01); *B27B 17/0025* (2013.01); *B27G 19/003* (2013.01)

(58) Field of Classification Search
CPC . B27B 17/00; B27B 17/0025; B27B 17/0083; B27G 19/00; B27G 19/003
USPC .............................................. 30/383; 33/630
See application file for complete search history.

(56) References Cited

U.S. PATENT DOCUMENTS 2,765,007 A * 10/1956 Hoffman ............ B27B 17/0025 30/123
2,807,292 A 9/1957 Gelinas
3,364,580 A 1/1968 Lucia
4,185,382 A 1/1980 Rawlinson
4,210,049 A * 7/1980 Gauthier ............ B27B 17/0058 83/788
4,341,018 A * 7/1982 Nelson ................ B27B 17/0025 30/383
4,377,910 A 3/1983 Landry
4,625,407 A * 12/1986 Wallis ................. B27B 17/0025 30/383
4,951,398 A * 8/1990 Bennett ............... B27B 17/0025 30/383
7,861,416 B1 * 1/2011 Clark .................. B27B 17/0025 30/371
2015/0121712 A1 * 5/2015 Ott ...................... B27B 17/0025 33/700

FOREIGN PATENT DOCUMENTS

DE 202005000972 U1 * 3/2005 ......... B27B 17/0025

* cited by examiner

*Primary Examiner* — Jared O Brown
(74) *Attorney, Agent, or Firm* — Hoffmann & Baron, LLP

(57) ABSTRACT

A saw guide for attachment to a portable, mechanical saw handle. The saw guide includes a substantially-rigid housing having a central cavity, expandably adjustable along at least one guide bar adapted to accommodate the handle. The housing defines a peripheral track channel. An elongate boom having a length is slidably mounted within the peripheral track channel, longitudinally extending outwardly from the track channel. A substantially-rigid finger member includes a base and is rotatably and slidably affixed about the boom. The finger member has a finger extending laterally from the boom beyond an extant of the housing. The finger member is selectively securable to the boom at a position along the length of the boom.

17 Claims, 8 Drawing Sheets

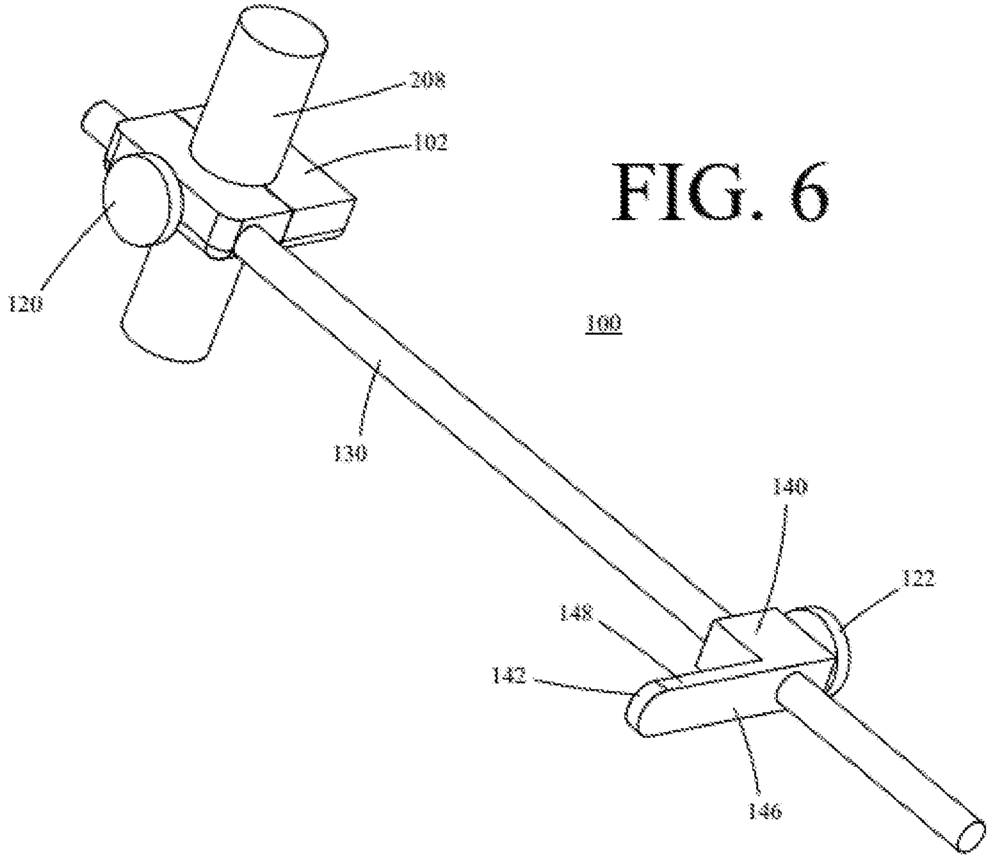
FIG. 6
FIG. 7
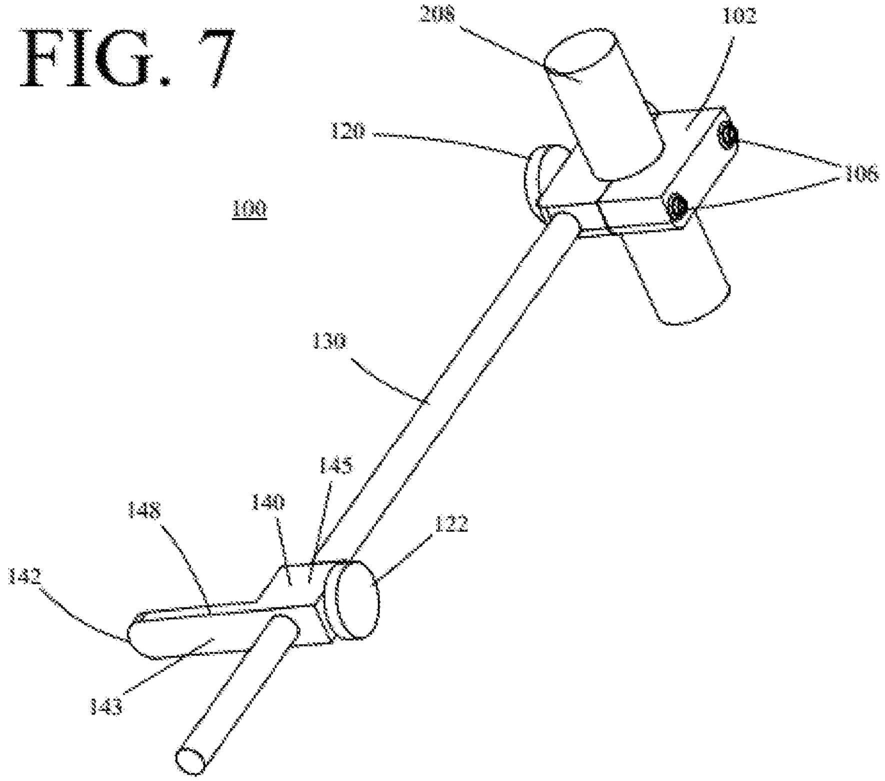

SAW GUIDE

FIELD OF THE INVENTION

The present invention relates to the field of lumber and more specifically to the field of cutting implement accessories.

BACKGROUND

When using a chain saw, or other portable mechanical saw, it is often desirable to cut logs and other rough timber to a specific length. Currently, in order to use a chain saw to cut logs in a particular length, it is necessary to repeatedly measure where a cut should be made. This often means stopping the chain saw, removing gloves, finding a measuring implement, making one or more marks on the timber, replacing the measuring implement, placing the gloves back on the operator's hands, starting the chain saw, and ultimately making cuts. The operation may even be repeated after each log piece is cut. Needless to say, there is a considerable amount of tedium in cutting wood with precision.

SUMMARY

The present invention is directed to a saw guide, system, and process for using the saw guide. A saw guide includes a housing, boom, and finger member. The substantially-rigid housing of the present invention has a central cavity, expandably adjustable along at least one guide bar to accommodate a saw handle. The housing can include a peripheral track channel with an axial housing compressor to secure the boom. The elongate boom is slidably mounted within the peripheral track channel and extends from the track channel. The substantially-rigid finger is rotatably and slidably affixed about said boom. The finger extends axially from the boom beyond an extant of the housing. The finger has a compressor adapted to form a press fit between the finger and the boom.

The system of the present invention includes a portable, mechanical saw having radially actuating teeth about a guide blade, extending into a saw casing, having a length and height. The casing includes a handle. A process of the present invention includes bracing a wood log having a cross-cut end surface. Then one slidably adjusts a substantially rigid finger member about a guide boom axially extending from a portable, mechanical saw, with the finger member having a finger length less than a saw guide blade height. The finger member is locked upon the guide boom. The finger member may be rotated to contact said cross-cut end surface in a position oriented to permit contact of the wood by the guide blade. Then saw teeth are initiated into actuation and the wood log is cross cut.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

BRIEF DESCRIPTION OF THE DRAWINGS

FIG. 6 is an upper, perspective view of an embodiment of a saw guide of the present invention.

FIG. 7 is an upper, perspective view of an embodiment of a saw guide of the present invention.

DETAILED DESCRIPTION

Figure 1:
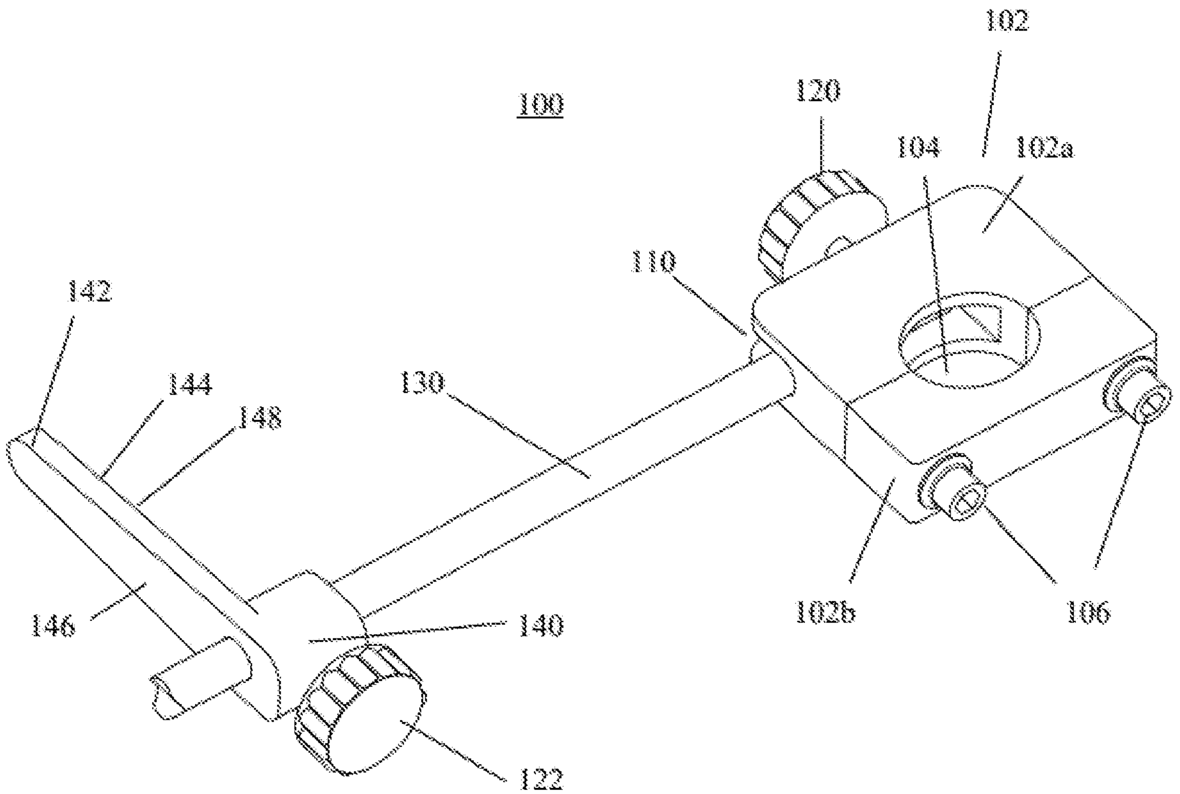
FIG. 1 is a perspective view of an embodiment of a saw guide of the present invention.
Figure 2:
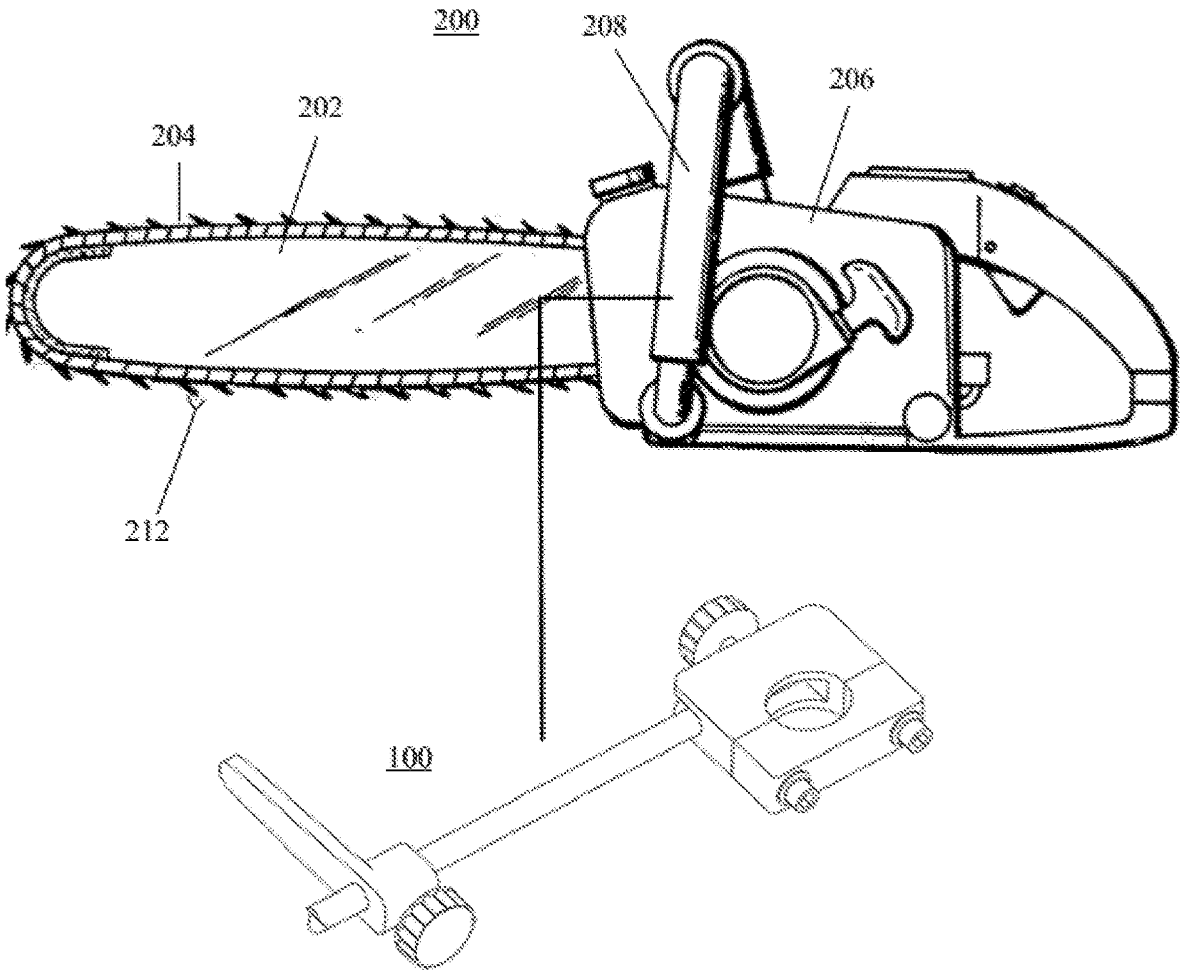
FIG. 2 is a perspective view of an embodiment of a system of the present invention.
Figure 3:
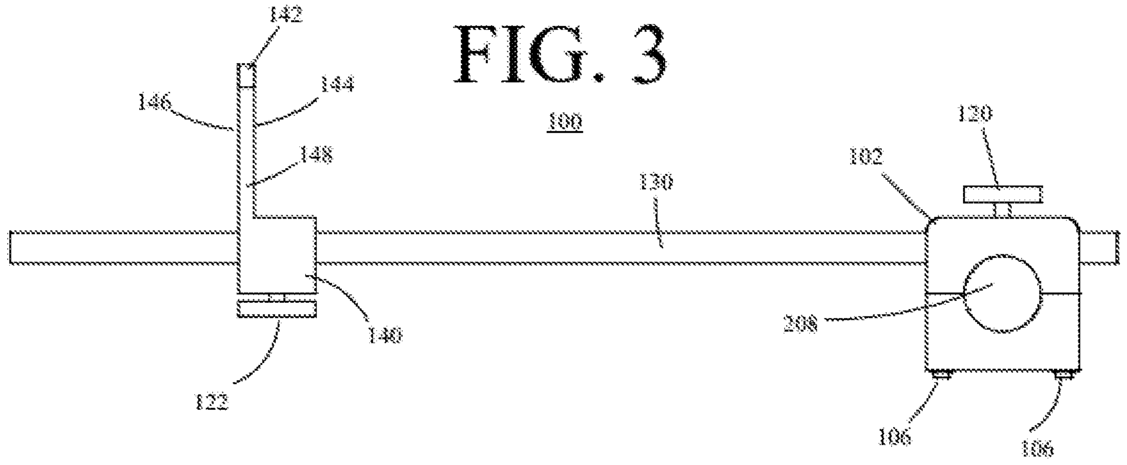
FIG. 3 is a top plan view of an embodiment of a saw guide of the present invention.
Figure 4:
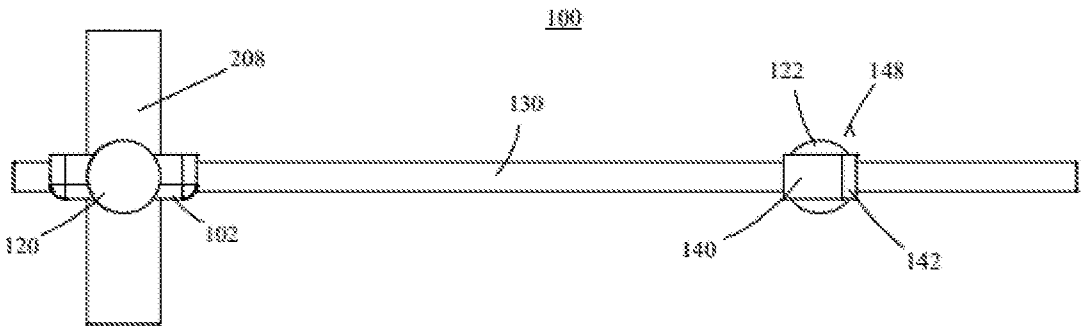
FIG. 4 is a front plan view of an embodiment of a saw guide of the present invention.
Figure 5:
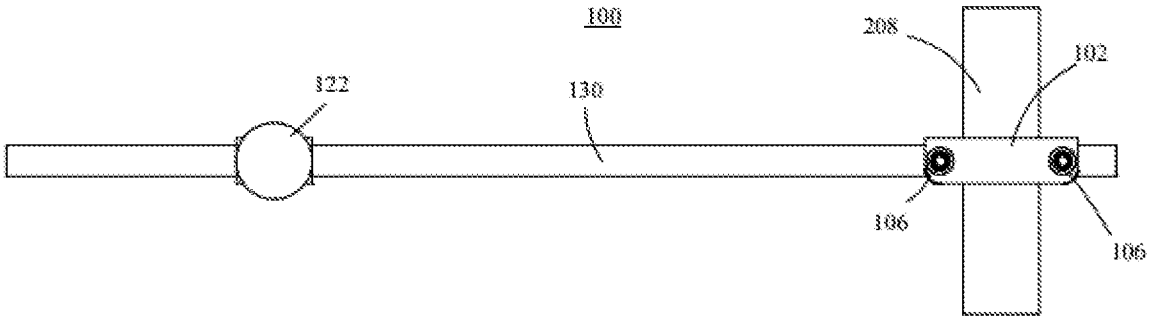
FIG. 5 is a rear plan view of an embodiment of a saw guide of the present invention.
Figure 8:
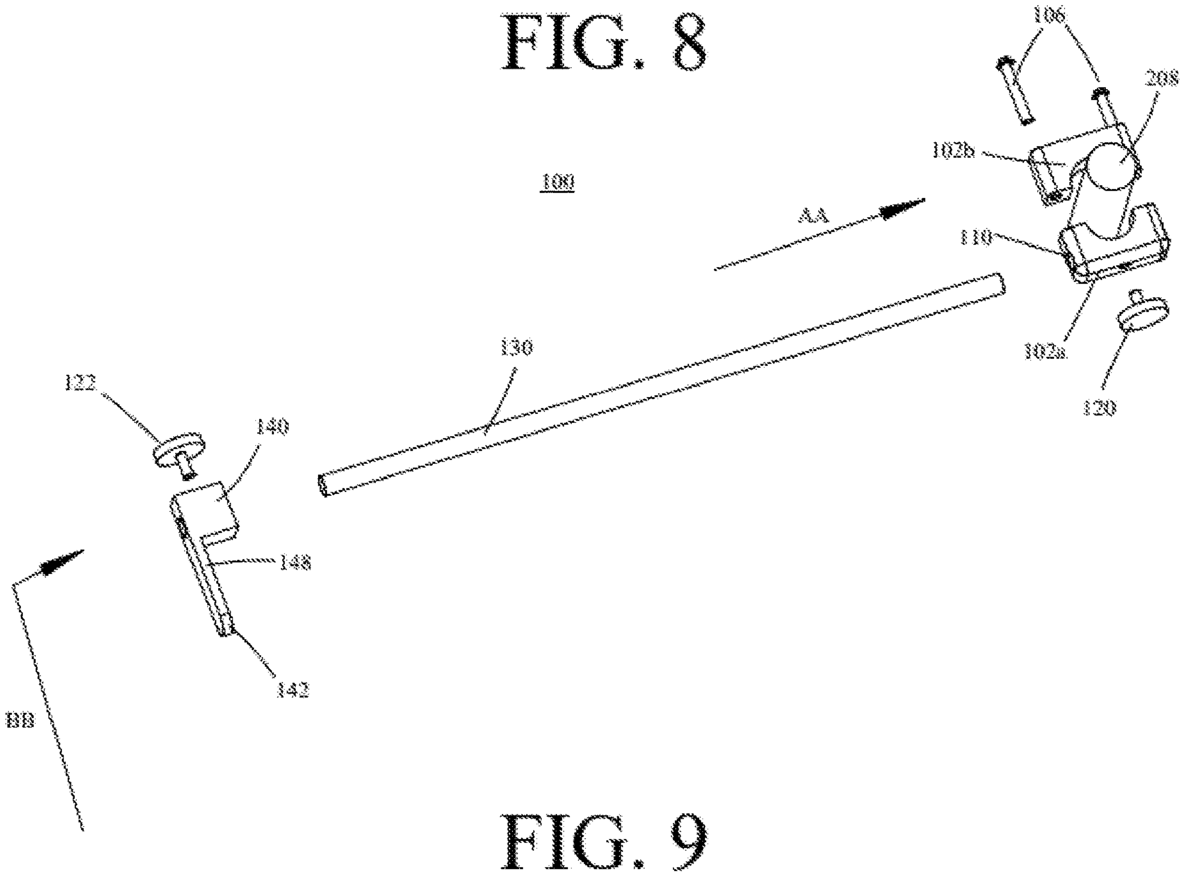
FIG. 8 is an exploded view of an embodiment of a saw guide of the present invention.
Figure 9:
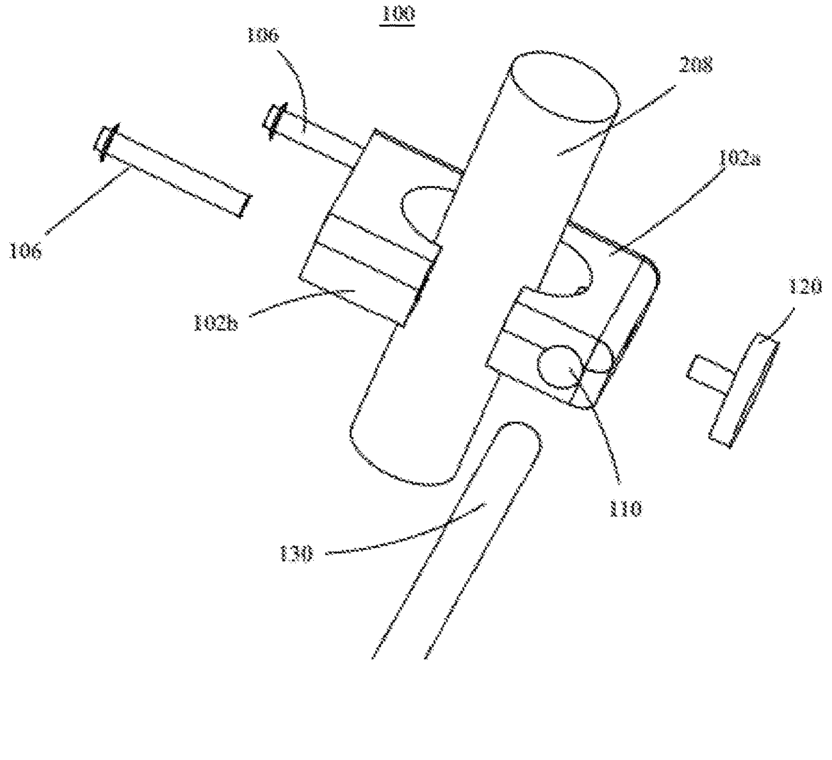
FIG. 9 is an exploded view of a version of a housing of the present invention taken along view line AA (from FIG. 8).
Figure 10:
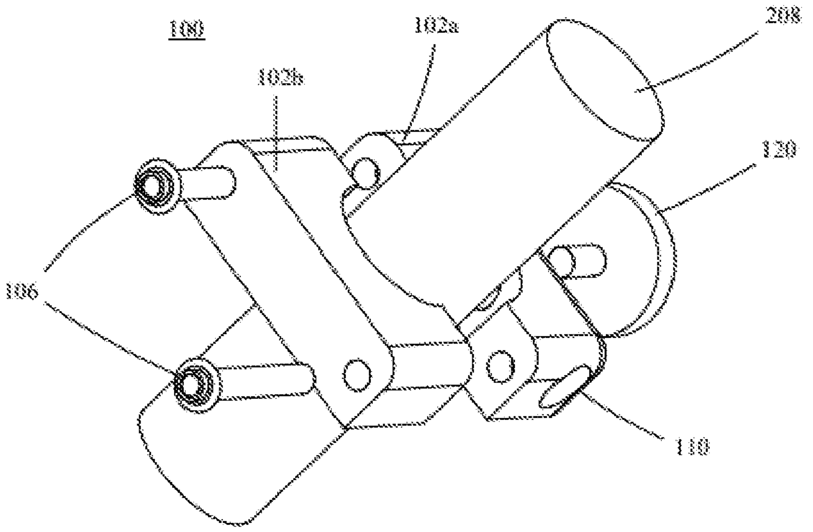
FIG. 10 is an exploded view of a version of a housing of the present invention.
Figure 11:
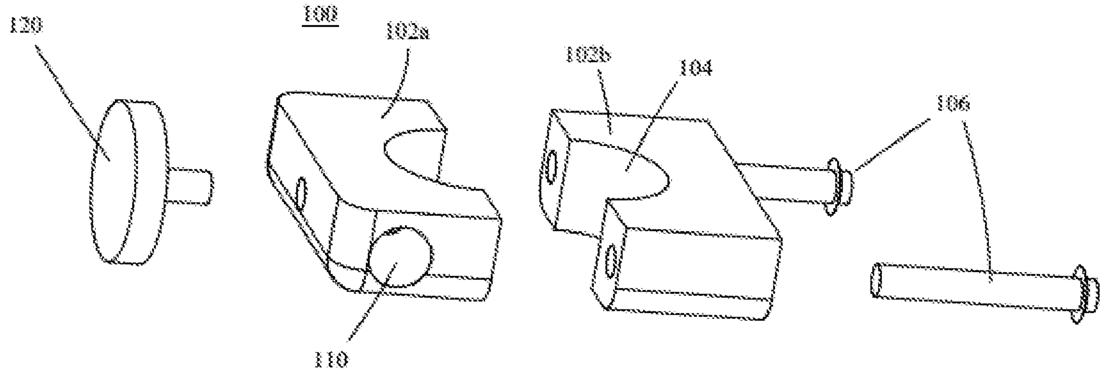
FIG. 11 is an exploded view of a version of a housing of the present invention.
Figure 12:
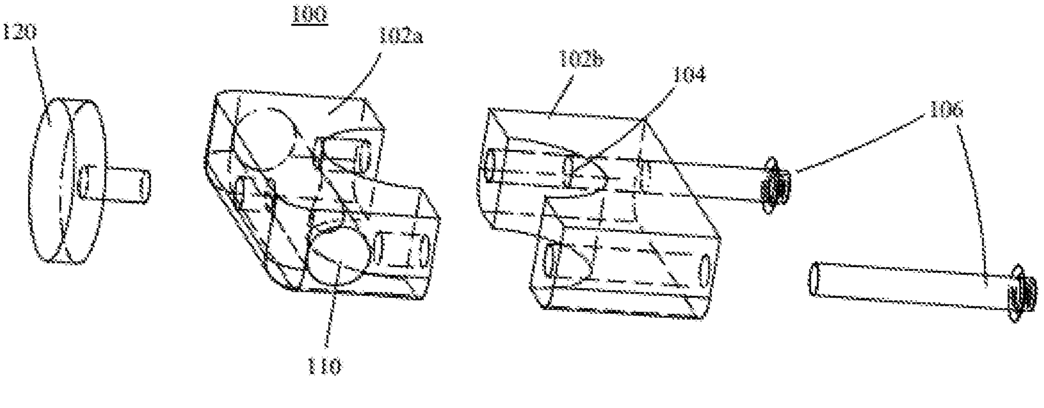
FIG. 12 is an exploded, revealed view of a version of a housing of the present invention.
Figure 13:
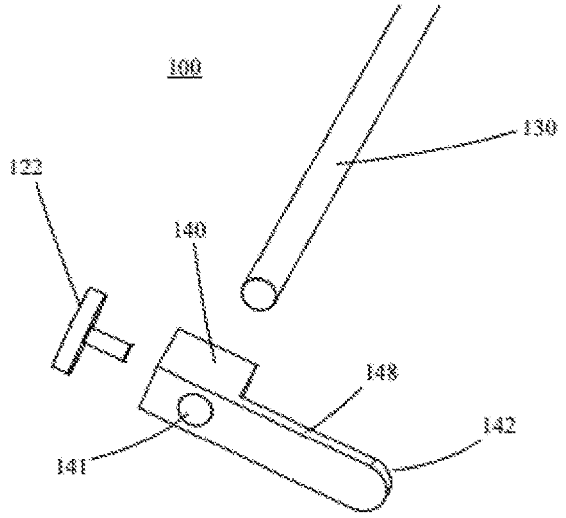
FIG. 13 is an exploded, isolated view of a version of a finger and boom of the present invention taken along view line BB (from FIG. 8).
Figure 14:
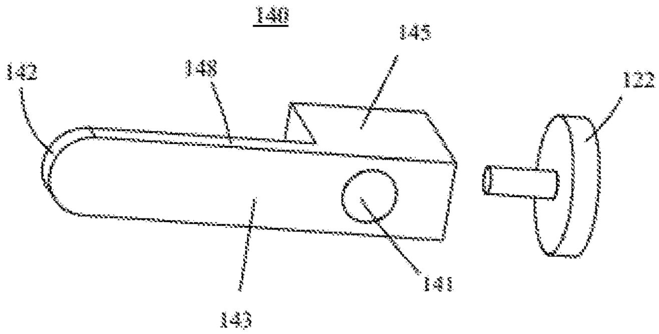
FIG. 14 is a perspective, exploded view of an embodiment of a finger of the present invention.
Figure 15:
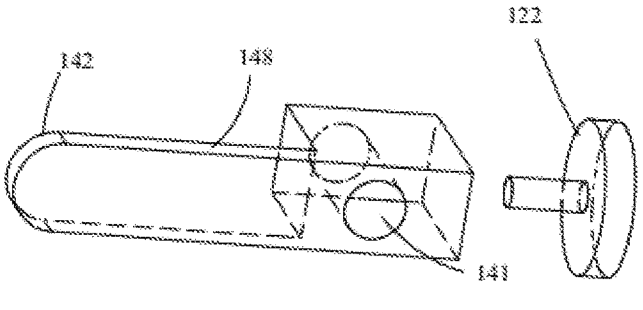
FIG. 15 is a perspective, exploded, revealed view of an embodiment of a finger of the present invention.

Referring first to FIGS. 1-2, a basic embodiment of the saw guide 100 and system 200 is shown. The saw guide 100 is meant to be a standalone invention; however, it is encompassed in the present invention to have a saw guide 100 that is adapted to interact with a specific saw, perhaps even sold as a kit, or a general class of mechanical saws that roughly similar structure. Because the present invention results in a process that has never before been capable, a process is included in the present invention.

The saw guide 100 includes a housing 102, boom 130, and finger member 140. As shown in FIGS. 1-2 and 9-12, the housing of the present invention is a component that holds the boom 130 while grasping a handle 208 of a portable, mechanical saw. The present invention was intended for use with chain saws, but any saw having the features of a chain may be utilized with and as the present invention. The attributes of a chain saw that make it capable of associating with the present invention are that it is portable and mechanically automated. Because the chain saw is brought to a log, rather than in a milling sense where the log is brought to the saw, there is infrequently a good, feasible means of controlling log cutting standardization. The conventional way of controlling log cutting includes utilizing measuring and marking implements such as a ruler, or measuring tape, and a marker. It is often believed in wood working industries, particularly furniture making, that quantitative measurement is to be avoided whenever possible in favor of comparative measuring. A chain saw, however, has only a limited quantity of components for which a measurement device can be utilized, and because a chain saw is meant to be portable, such measurement devices cannot be heavy or unwieldy.

The saw guide 100 has advantageous attributes that allow repeatable, relatively accurate, measurement and cutting of wood portions that occurs through comparative measurement rather than quantitative measurement. The preferred housing 102 is separable in two portions 102*a*, 102*b* that separate about a central cavity 104 that is sized to retain a range of saw handle housings. Although for purposes of this disclosure, the invention may be discussed in reference to a chain saw, this is for purposes of simplistic explanation, and it is understood that any portable, mechanical saw will suffice. Accordingly, any discussion herein concerning a chain saw is meant as an example of a portable mechanical saw. The portable nature of a chainsaw necessitates some component whereby a user holds the chain saw, usually manifested as a handle. Most conventional chainsaws include a handle 208 that straddles multiple sides, as well as the top, of a casing 206 so as to cater to different hand grips on the saw—particularly suiting to right-handed and left-handed users. Accordingly, the present invention is crafted to be amenable to both right-handed and left-handed grips, as well as over-the-top grips. The separable nature of the housing 102 permits the housing to be placed at various elevations along the handle, and self-supportingly clamp thereon. The preferred housing is constructed of a rigid material suitable to permit the housing to maintain its position and the position of components that it supports, particularly an extendable boom 130. The entirety of the housing need not be rigid, merely the portions necessary for support of itself and the stationary positioning of measurement components.

The housing 102 ought to be separable in order to grasp internally a saw handle 208. The specific mechanism by which the housing separates is less significant than the fact that it does separate to releasably affix to a saw handle. Chain saw handles tend to come in standardized sizes having an approximate one inch (approximately 25 mm) diameter, and the cavity 104 accommodates such sizes, as well as accommodating variations in the same. The preferred housing 102 of the present invention includes housing portions 102*a*, 102*b* that separate on guide bars 106 that serve as a track for one portion 102*a* to slide thereon to provide distance between itself and the other portion 102*b*. Sliding the housing portions 102*a*, 102*b* thereon permits an expansion of the cavity 104 for affixation of the guide 100 upon the handle 208 of the chain saw 250. In certain embodiments of the present invention the guide bars 106 may be intentionally removable by a user. In other versions, the guide bars also provide the basis of tightening the housing portions 102*a*, 102*b* one to the other. In such versions, an Allen wrench may be utilized to turn the guide bars 106.

Turning to FIGS. 1-2, and 6-9, the housing 102 provides a place for the boom 130 of the present invention to affix. As discussed previously, the boom 130 provides the component that allows comparative measurement such that the boom 130 can be placed alongside the wood intended to be cut and then compared to the wood for measured cutting. The boom 130 should therefore have a length that allows the cutting of standard size wood logs for industrial, commercial, and residential purposes. The residential and commercial version of the preferred boom 130 should accommodate a finger member 140 that permits finger placement at sixteen inches (approximately forty cm) from the saw blade guide 202. The standard length for firewood is sixteen inches (approximately forty cm). The reason for this is that firewood is typically sold by the cord or fractions of a cord, an amount of wood that measures four feet (1.2 m) high by four feet wide by eight feet (2.4 m) long. Even though most fireplaces can fit a piece of wood longer than sixteen inches, firewood is cut to fit in the cord and not the fireplace. A tree is usually cut up into 8-foot logs, a length easy to haul out of the forest. These are then cut up into six 16-inch "rounds," which are split into firewood. The boom 130 needs to be self-supporting, and accordingly the preferred boom 130 of the present invention is constructed of steel.

With reference to FIGS. 1-2 and 9-12, the boom 130 fits within a channel 110 in the housing 102. The channel 110 of the present invention is simply an aperture, interior or exterior, that allows the boom 130 to be held stationary by the housing. Because the present invention will undergo a significant amount of vibration during use, the channel is preferred to hold the entirety of the exterior circumference of the boom, and allows the boom entry to a degree that a significant portion of the boom is held within the housing. It is more preferred that the channel runs entirely through the housing such that the boom fits not only well within the housing, but through the housing as well. A compressor 120 positioning in the housing locks the boom 130 into place within the channel 110 such that the boom is held stationary. A compressor 120 for purposes of the present invention is merely a mechanism that applies physical contact between two or more components to prevent the movement of the components with respect to the others. The preferred compressor of the present invention is a threaded, turn-compressor—although any form of contact-based compression may be utilized as a compressor. The compressor therefore is said to create a press-fit relationship between the components which may include merely surface-to-surface contact, or create an interference fit whereby the one component deforms another to hold components stationary. So, when the present disclosure discusses "press-fit" relationship, it is meant to mean at least a press fit (which includes an interference fit). When the boom 130 can be passed through the housing 102, the boom 130 can be further stabilized by positioning the same against components of the chain saw 250, for example the casing 106 or the blade guide 202.

Turning now to FIGS. 1-2, 8, and 13-15, the present invention relies upon the finger member 140 to provide comparative measurement. The finger member 140 (or simply "finger") slides upon the boom 130, which permits suitable stability for use with the present invention. Like the housing, the finger member 140 should be constructed of rigid material that allows the finger member 140 to be self-supporting. Not only should the rigidity of the finger member be self-supporting, but the finger member should be able to contact a hard surface, such as wood, without the extension component of the finger deforming. The preferred finger includes two portions; the finger extension 143 and the finger base 145. The component of the finger member 140 that provides the accurate measurement is the finger extension 143. However, because the finger extension 143 preferably includes constrained dimensions at the point of physical contact (or near contact) with wood, it is preferred that a thicker, stockier base member 145 buttress the stability of the finger member about the boom 130. As will be discussed in greater detail subsequently, it is preferred that the finger member extension include a finger girth 148 that is approximately equal to the girth 212 of the chain kerf 204 of the chain saw 250. If such a component were to be compressed about the boom at such slight dimensions, the capacity of the extension that have stability would be greatly jeopardized and the finger would likely have significant movement/play about the boom. The more physical mass accorded to the finger member to be compressed to the boom, for example by the finger compressor 122, the greater the stability. Therefore, the optimum compromise is to include a finger member 140 with thick dimensions about the point of contact with the boom 130, while having a narrow finger extension for contact, actual or proximate, with the wood. The slight dimensions of the finger extension make it such that the finger member should be constructed of a rigid plastic to ensure that not only can the finger member be pressed against wood without deformation or dislocation, but also can sustain the jarring contact that can result from a high vibratory tool, such as a chainsaw, that relies on human strength for stability.

Figure 16:
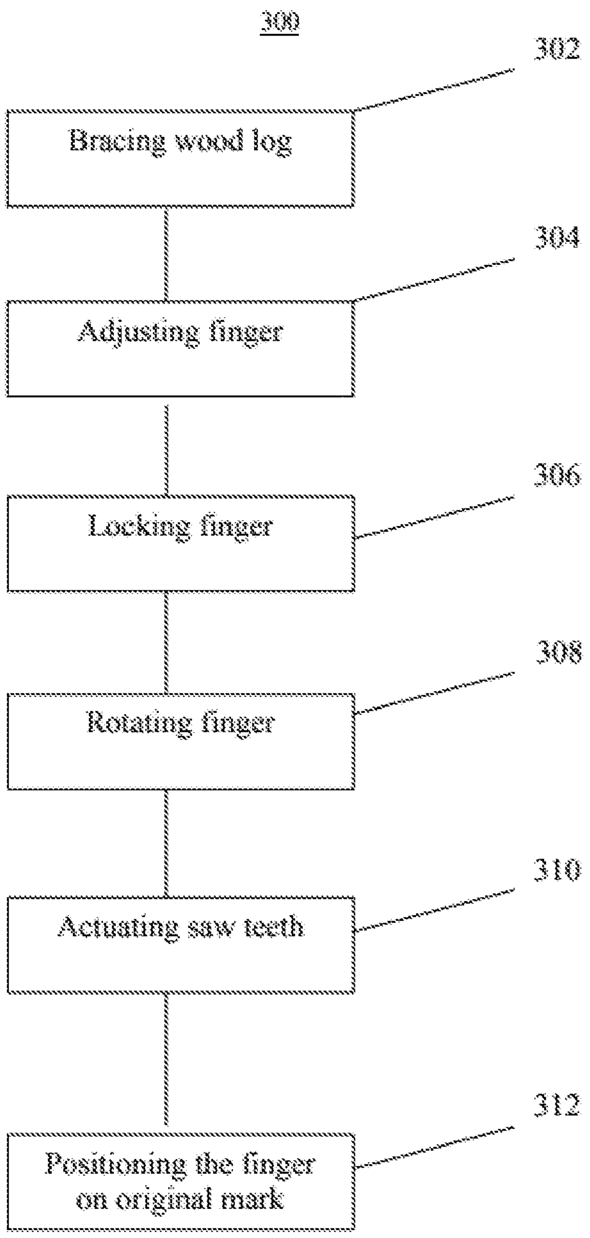
FIG. 16 is a view of an embodiment of a process of the present invention.

The finger member 140 includes a finger channel 141 that accepts the boom 130 into its interior. The finger compressor 122 compresses the finger member about the boom to lock the elements in a stationary position that can withstand significant impact. The wider the base, the greater the stability. It is preferred that the base member 145 has a girth width at least twice that of the finger extension 143. It is even more preferred that the base member have a girth width at least four times greater than that of the finger extension. Accordingly, the finger member 140 includes a girth width 148 that contacts, or is positioned closely to, wood. Now additionally with respect to FIG. 16, when is cut using the process 300 of the present invention, wood is braced 302 in a supporting manner that permits a saw to contact the wood without substantial dislocation of the wood. The present invention may be utilized with wood that has already been cut from a tree and would likely have a substantially smooth surface from the 'felling' cut. The finger member 140 has two surfaces, an interior surface 144 and an exterior surface 146. The interior surface 144 is preferably substantially flush so as to permit the finger 140 to be rotated 308 to contact the felled cut, i.e. original cut, of the wood. Alternatively, the original cut for purposes of the present invention can simply be the cut that provides the first flush cross-section surface of wood available to the user. Prior to this step, the finger member 140 would ideally be positioned 304 on the boom 130 so as to provide the correct distance for the repeatable cut length. When the finger 140 is locked 306, as discussed in relation to the compressor, or otherwise, the finger will remain stationary for repeatable cutting. The repeatable cutting can occur under multiple mechanisms of use, including pre-marking multiple cut lines prior to whole cross-cutting or cutting without marking.

In mechanisms where the present invention directly cuts into wood through actuation 310 of the saw teeth, the user places the locked finger 306 adjacent to the original cross-cut and simply activates 310 the chain through the wood with the finger member inside surface 144 contacting, or closely contacting the wood. The finger member 140 includes a rigid, rounded terminus 148 in preferred embodiment to permit glancing contact (i.e., contact that does not snag the wood) with the wood—so as to avoid dislocation of the finger member. This is advantageous in scenario even wherein contact between the finger member and the wood is not meant, but could be incidental due to the significant vibration of the chain saw. The rounded edge of the finger extension as the terminus permits the terminus to position against, slide on, or briefly contact wood without retention. Although the present invention is constructed such that the finger member need not contact wood, it can do so for short or prolonged periods without detrimental effect.

The present invention method 300 permits the saw guide 100 to be used with a chain saw 150 in a manner that permits measurement on a cut-by-cut basis, or as multiple-measure-multiple-cut basis. In other words, the user of the system 200 or saw guide 100 can place the finger member saw guide adjacent to the cross-cut surface of a log, or directly upon it with the inner surface (depending on the accuracy degree sought by the user), and actuate 310 the saw teeth to wholly cut through the log. Alternatively, the saw teeth can be actuated 310 merely to the extent need to make a short cut in the top of the log. At this point, the user can choose to continue the cut or cease the cut and reposition 312 the finger at that original mark. At this point, no 'individual logs' have been cut, but the user can make a secondary mark (i.e., any mark after the original mark has been made), by actuating 310 the saw teeth, that is the same length from the original mark to this secondary mark to the cross cut to the original mark. A user can continue to place the finger member above, on, or in the last mark made and make a new secondary mark. At this point, the log to-be-cut may filled with multiple equidistant marks demarcating the potential equal sized logs to be cut.

Because the mark cuts in the wood log are approximately the same size in the log, it is beneficial to have a finger girth width that is approximately equal to mark cuts, which presumably are approximately equal to the kerf size of the chain saw blade. For purposes of this disclosure, and because chain sizes tend to be approximately equal to the guide blade (upon which a chain sits), the finger girth width can be compared to the guide blade. The finger girth width is approximately equal to or smaller than the guide blade. Accordingly, the finger member "fits" or forms a close-fit within the cut marks by the chain saw. This is a significant advance from the prior art, which provides guides that merely interact with a side cross-cut (i.e., flat surface). The present invention is capable of interaction with a side cross-cut, and also interaction with a cross-cut that lacks significant depth. The preferred finger member girth width is almost exactly the girth width of the guide blade, and because a kerf tends to be slightly larger than the guide blade, the finger member fits within the cut mark with enough room on the sides to permit sufficient wiggle room such that unsteady hands can find a fit between the finger member and the cut, yet not result in a deviance that throws off the deviation of firewood logs significantly. Again, the finger member may fit within the cut mark only thought its terminus, or some other portion of the finger member.

The finger member girth width ought not be less than half the size of the guide blade girth width, nor much greater than 150% of the girth width thereof. As the preferred guide blade is approximately ⅛ inch (~3 mm), the preferred finger girth width is ⅛ inch (~3 mm). Sizing the finger member girth width equivalent to that of the guide blade girth allows a width that certainly fit into a cut mark as the saw chain kerf cannot be smaller than the guide bar. However, because the kerf can be larger than the guide bar, the finger member may be slightly larger than the guide bar. The finger member girth width should not be larger than the chain kerf. Because the finger member is capable of rotation 308, the finger can be oriented to fit parallel to the cut, obliquely thereto, or such that the only the terminus fits therein.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A saw guide for attachment to a portable, mechanical saw handle, said guide comprising:

a housing having a circular central cavity, the housing including a substantially rectangular first portion and a substantially rectangular second portion that expandably adjust relative to each other via two fasteners to accommodate the handle, the first portion defining a peripheral track channel extending therethrough along a width of said housing, and the first portion having a hollow central portion and an axial housing compressor extending within said first portion perpendicularly to said track channel;

an elongate cylindrical boom having a length and slidably mounted within said peripheral track channel longitudinally extending outwardly from said track channel, wherein said boom has an adjustable state wherein said boom is positionally adjustable relative to the housing, and a fixed state wherein the position of the boom relative to said housing is fixed upon actuation of the housing compressor without the need for tools; and an L-shaped finger member having a base including a through-hole rotatably and slidably affixed about said boom, said finger member having a finger extension extending laterally from said base and said boom beyond an extant of said housing, and said finger extension is configured to engage an object to be cut, and said finger member having a finger compressor configured to selectively secure said finger member to said boom without the need for tools at a predetermined lateral position along the length of said boom and at an angular position about the boom;

wherein the circular central cavity is defined by a semicircular recess in the first portion and a semicircular recess in the second portion that form a complete circle when the first and second portions are put together;

wherein said track channel extends along the width of said housing through at least three quarters of the width of said housing to permit adjustment of said boom within;

wherein the housing compressor and finger compressor are threaded fasteners having knurled knobs for facilitating gripping by a hand of a user; and wherein said finger extension includes a flat interior surface facing the housing and an opposed flat exterior surface, and said finger extension terminates in a rounded terminus surface.

2. A cutting system comprising:

a portable, mechanical saw having radially actuating teeth about a guide blade, extending into a saw casing, having a length and height, said casing having a handle; and a saw guide comprising:

a housing having a circular central cavity, the housing including a substantially rectangular first portion and a substantially rectangular second portion that expandably adjust adjustable along at least one guide bar relative to each other via two fasteners adapted to accommodate the handle, the first portion defining a peripheral track channel extending therethrough along a width of said housing, and the first portion having a hollow central portion and an axial housing compressor extending within said first portion perpendicularly to said channel;

an elongate cylindrical boom having a length and slidably mounted within said peripheral track channel longitudinally extending outwardly from said track channel, wherein said boom has an adjustable state wherein said boom is positionally adjustable relative to the housing, and a fixed state wherein the position of the boom relative to said housing is fixed upon actuation of the housing compressor without the need for tools; and an L-shaped finger member having a base including a through-hole rotatably and slidably affixed about said boom, the finger member having a finger extension extending laterally from said base and said boom beyond an extant of said housing, and said finger extension is configured to engage an object to be cut, and said finger member having a finger compressor configured to selectively secure said finger member to said boom without the need for tools at a predetermined lateral position along the length of said boom and at an angular position about the boom, the finger extension having a first and a second flat opposed surfaces extending to a distal end of the finger extension, the first surface facing the housing and the second surface facing away from the housing;

wherein the circular central cavity is defined by a semicircular recess in the first portion and a semicircular recess in the second portion that form a complete circle when the first and second portions are put together;

wherein said track channel extends through at least three quarters of the width of said housing to permit adjustment of said boom within, and along a width direction of said housing;

wherein the housing compressor and finger compressor are threaded fasteners having knurled knobs for facilitating gripping by a hand of a user; and wherein said finger extension includes a flat interior surface facing the housing and an opposed flat exterior surface, and said finger extension terminates in a rounded terminus surface.

3. The system of claim 2 wherein said elongate boom is slidably adjustable in the housing along the width thereof and is selectively securable therein.

4. The system of claim 2 wherein said finger extension projects parallel to said blade.

5. The system of claim 4 wherein said finger extension includes a finger extension length less than 0.75× a height of said blade.

6. The system of claim 5 wherein said finger extension length is less than 0.5× the height of said blade.

7. The system of claim 2 wherein said track channel extends through the width of said housing to permit said boom to extend beyond said housing in two aspects.

8. The system of claim 2 wherein said finger extension terminates in a substantially rounded terminus surface.

9. The system of claim 3 wherein said finger member body has a width greater than a width of the finger extension.

10. The system of claim 2 wherein said finger includes a finger width within +/−50% of a guide blade width.

11. The system of claim 10 wherein said finger width is within +/−25% of said guide blade.

12. The system of claim 2 wherein said finger includes a finger width equal to or smaller less than a guide blade width.

13. The system of claim 12 wherein said finger width is between 50% to 150% of said guide blade width.

14. A process of using a saw guide, said process comprising:

mounting a saw guide as defined in claim 1 to a portable, mechanical saw handle;

bracing a wood log having a cross-cut end surface;

slidably adjusting the finger member about said boom, said finger member having a finger length less than a saw guide blade height;

locking said finger member upon said boom;

rotating said finger member to contact said cross-cut end surface in a position oriented to permit contact of said wood log by said guide blade; and initiating radially actuating teeth about said guide blade and cross-cutting through said wood log.

15. The process of claim 14 wherein said adjusting step includes pressing said saw guide blade into said log to leave an embedded original mark, and further comprising the step of positioning said finger in said original mark and embedding an ancillary embedded mark with said guide blade downward from said original mark.

16. The process of claim 14 wherein said adjusting step includes slidably adjusting said finger having said finger length less than said saw guide blade height.

17. The process of claim 14 wherein said adjusting step includes pressing said saw guide blade into said log to leave an embedded original mark, and further comprising the step of positioning said finger above said original mark and embedding an ancillary embedded mark with said guide blade downward from said original mark.

* * * * *